United States Patent
> Olhoft et al.

[15] 3,642,507

[45] Feb. 15, 1972

[54] COMPOSITIONS OF NITROCELLULOSE AND CYCLIC ESTER POLYMERS

[72] Inventors: Gary Vernon Olhoft, Charleston, W. Va.; Nelson Richard Eldred, Memphis, Tenn.; Joseph Victor Koleske, Charleston, W. Va.

[73] Assignee: Union Carbide Corporation, New York, N.Y.

[22] Filed: Apr. 1, 1969

[21] Appl. No.: 812,384

[52] U.S. Cl. ............................106/182, 106/179, 117/157, 117/161 C, 260/13 R, 260/17 R
[51] Int. Cl. ..........................................................C08b 21/14
[58] Field of Search ...............260/78.3, 13, 17; 117/166; 106/182, 178, 179

[56] References Cited

UNITED STATES PATENTS

| | | | |
|---|---|---|---|
| 2,423,823 | 7/1947 | Baker | 260/16 |
| 2,684,310 | 7/1954 | Prance et al. | 117/138.8 |
| 2,962,524 | 11/1960 | Hostettler et al. | 260/484 |
| 2,974,057 | 3/1961 | Adams | 117/12 |
| 2,977,385 | 3/1961 | Fowler et al. | 260/475 |
| 3,036,976 | 5/1962 | Sanderson | 260/17 |
| 3,047,524 | 7/1962 | Bowman | 260/32.4 |
| 3,268,486 | 8/1966 | Klootwijk | 260/78.3 |
| 3,284,417 | 11/1966 | Hostettler et al. | 260/78.3 |
| 3,277,031 | 10/1966 | Valls et al. | 260/13 |
| 3,312,753 | 4/1967 | Bailey | 260/823 |
| 2,689,799 | 9/1954 | Albus et al. | 106/180 |
| 2,744,025 | 5/1966 | Albus et al. | 106/179 |

FOREIGN PATENTS OR APPLICATIONS 307,289   2/1930   Great Britain ..........................260/13

Primary Examiner—William Short
Assistant Examiner—E. Nielsen
Attorney—Paul A. Rose, Louis C. Smith and Vincent P. Pirri

[57] ABSTRACT

Cyclic ester polymers as plasticizers for nitrocellulose, as in printing inks, lacquer coatings, adhesives, films and moldable plastics. Flexographic and gravure printing inks employing cyclic ester polymers as binder, particularly with dyes as coloring agents.

8 Claims, No Drawings

COMPOSITIONS OF NITROCELLULOSE AND CYCLIC ESTER POLYMERS

BACKGROUND OF THE INVENTION

1. Field of the Invention

This invention relates to compositions containing a cyclic ester polymer, which compositions exhibit superior workability properties and which yield films with superior resistance to aging, high gloss and high abrasion resistance. In one aspect, it relates to compositions wherein a cyclic ester polymer serves as a plasticizer for nitrocellulose. In another aspect, the invention relates to flexographic and gravure printing inks, particularly those employing dyes rather than pigments, wherein a cyclic ester polymer serves as the binder.

2. Description of the Prior Art

Nitrocellulose is widely used as the vehicle in flexographic and gravure printing inks. Both types of inks are low viscosity, fast drying, and noncuring, flexographic inks being limited to the use of alcoholic or aqueous solvents because of the rubber printing plates employed in this process. Therefore, low nitrogen, spirit soluble grades of nitrocellulose, such as the SS grades produced by Hercules Powder Company, are typically used in flexographic inks. Since gravure presses have only metal parts, stronger solvents can be used in gravure inks and the higher nitrogen grades of nitrocellulose resin, such as the RS grades produced by Hercules Powder Company, are typically employed therein, often with an ester as the active solvent and toluene and alcohol as diluents.

As is well known, the nature of the gravure printing process dictates that gravure inks must be strongly cohesive to transfer easily and completely from the printing plate. Flexographic inks must transfer properly from roll to roll to printed surface and must be of low viscosity. Nitrocellulose is widely used in these inks because of its excellent solvent release, high softening temperature, film-forming properties, and compatibility with other resins. Nitrocellulose is a major resin component in many solvent inks for printing paper, paperboard, cellophane and aluminum foil. It must be plasticized in these inks and is usually modified with other resins. The plasticizers render the ink films flexible and also promote their adhesion to various substrates. The resins used to modify nitrocellulose, such as rosin derivatives, typically have a relatively low solution viscosity. This allows the use of higher resin concentrations, which permits higher pigment concentrations and yields glossier films.

The previously used plasticizers for nitrocellulose in these applications are generally of the solvent type and have several drawbacks in that they are subject to bleeding and may cause blocking. Dibutyl phthalate, dioctyl phthalate, and tricresyl phosphate are relatively common plasticizers. Other plasticizers, e.g., nonsolvent-type plasticizers such as blown castor oil, are used in special applications. A delicate balance must be maintained with these plasticizers, as too little plasticizer will give brittle inks with poor adhesion, but too much plasticizer will tend to cause blocking in the rewinding of the printed substrate.

Nitrocellulose lacquers are commonly used for many applications including wood sealers, wood-finishing varnishes, metal coatings, etc. These lacquers contain many different types of resins and oils, such as rosin derivatives, acrylic esters, shellac, vinyl resins, alkyd resins, and castor, linseed, and soybean oil, which may also function as plasticizers for the nitrocellulose. Solvent-type plasticizers such as dibutyl phthalate are also added to improve flexibility and to impart resistance.

A problem with nitrocellulose lacquers resides in the high viscosity of nitrocellulose solutions, which requires using low molecular weight types of nitrocellulose to achieve satisfactory viscosities, which in turn leads to lower film strength. Also, relatively large amounts of plasticizer are required, and the plasticizers commonly in use lower the film strength and tend to increase the tackiness of the films. Plasticizer migration through the film, which generally results in brittleness, can be reduced by the use of liquid polymeric materials, but such materials also tend to reduce the film strength and impart tackiness to the films. Commercial nitrocellulose films currently used are also sensitive to sunlight and yellow on exposure thereto, this problem being reducible but not entirely eliminated by the use of pigmentation and ultraviolet absorbents. These nitrocellulose lacquers, because of their flammability, are limited in the areas of applicability.

Celluloid, the first commercially successfully, moldable, synthetic thermoplastic resin, is still widely used in molding due to its ease of fabrication, toughness, rigidity, water resistance, and comparatively low price. Celluloid consists essentially of a solid solution of nitrocellulose and camphor in a ratio of approximately 3:1. The tendency of the camphor to sublime results in brittleness and reduces the useful life of the celluloid. While celluloid can be formed into articles by sheeting, extrusion, and film casting, it cannot be injection molded because the temperature required for thermoplastic flow is too close to the decomposition temperature of nitrocellulose.

SUMMARY OF THE INVENTION

We have surprisingly found that when a cyclic ester polymer is admixed with compositions comprising nitrocellulose, in an amount ranging from about 10 to about 50 weight percent of cyclic ester polymer based on the combined weight of the cyclic ester polymer and nitrocellulose, films formed from such composition exhibit improved properties. Thus, such films generally show superior strength, hardness, extensibility, flexibility, clarity, gloss, impact resistance, heat and light resistance, and water resistance as compared to films formed from current commercial nitrocellulose compositions such as nitrocellulose, rosin derivatives, and alkyd mixtures. Such superior properties are shown not only in printing inks but also in lacquer coatings, adhesives, films, and moldable plastics, e.g., celluloid. Thus, the cyclic ester polymers have been found to be excellent plasticizers for nitrocellulose without having the drawbacks associated with previously employed nitrocellulose plasticizers, and, in fact, resulting in surprisingly superior properties for the plasticized composition.

We also have found that when such a cyclic ester polymer is used as essentially the sole binder in flexographic dye inks, that is, flexographic inks wherein dyes rather than pigments are employed as the coloring agents, brilliant glossy films are produced which exhibit very good adhesion to a wide variety of substrates. These films have excellent flexibility and water resistance. Such inks are excellent for printing paper or aluminum foil used in packaging.

DESCRIPTION OF THE PREFERRED EMBODIMENTS

The polymers of cyclic esters which are contemplated in the practice of the invention are those which possess a reduced viscosity value of at least about 0.02 and desirably from about 0.1 to about 15, and higher. The preferred polymers of cyclic esters have a reduced viscosity value of from about 0.2 to about 10. These polymers are further characterized by the following recurring structural linear Unit I:

I
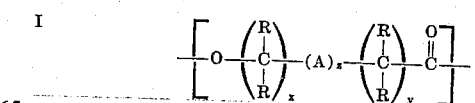

wherein each R, individually, is hydrogen, alkyl, halo, or alkoxy; wherein A is the oxy group; wherein $x$ is an integer from 1 to 4; wherein $y$ is an integer from 1 to 4; wherein $z$ is an integer of 0 or 1; with the provisos that (a) the sum of $x+y+z$ is at least 2 and not greater than 7, providing, however, that the sum of $x+y+z$ does not equal 3, and (b) the total number of R variables which are substituents other than hydrogen does not exceed 3, preferably does not exceed 2. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, and the like. It is further preferred that the total number of carbon atoms in the R substituents does not exceed 8.

In one embodiment, highly desirable polymers of cyclic esters which are contemplated are characterized by both recurring structural unit I supra and recurring structural unit II:

II  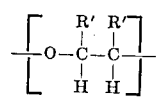

wherein each R', individually, is hydrogen, alkyl, cycloalkyl, aryl, or chloroalkyl, or in which the two R' variables together with the ethylene moiety of the oxyethylene chain of unit II form a saturated cycloaliphatic hydrocarbon ring having from four to eight carbon atoms, desirably from five to six carbon atoms. It is preferred that recurring unit II contains from two to 12 carbon atoms. Illustrative R' variables include methyl, ethyl, n-propyl, isopropyl, t-butyl, the hexyls, the dodecyls, 2-chloroethyl phenyl, phenethyl, ethylphenyl, cyclopentyl, cyclohexyl, cycloheptyl, and the like. It is preferred that R' be hydrogen; or lower alkyl, e.g., methyl, ethyl, n-propyl, isopropyl, chloroalkyl, e.g., 2-chloroethyl; and the like.

The aforedescribed recurring linear unit (I) is interconnected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infrared analysis, which factor is readily understandable since macromolecules are involved. On the other hand, the relatively low molecular weight cyclic ester polymers, e.g., those having reduced viscosity values below about 0.3, are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. If desired, the hydroxyl and carboxyl end groups, if present, can be esterified or acylated, such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic comonomer which is copolymerizable therewith, e.g., cyclic ethers such as alkylene oxide, oxetane, tetrahydrofuran, etc., the polymeric chain of the resulting copolymeric product will be characterized by both recurring linear unit I supra as well as by a recurring linear unit which would correspond to the additional polymerizable cyclic comonomer in the monomeric mixture. When the comonomer is an alkylene oxide, then the resulting copolymeric product will contain both recurring linear unit I and recurring linear unit II in the copolymeric chain thereof. The interconnection of linear unit I and linear unit II supra does not involve or result in the direct bonding of two oxy groups, i.e., —O—O—. In other words, the oxy group (—O—) of recurring linear unit II is interconnected with the carbonyl group

of recurring linear unit I supra or with the alkylene moiety of a second oxyalkylene unit (II).

By way of a second illustration, when a comonomer such as tetrahydrofuran is employed in the polymerization process, the resulting copolymeric product will contain recurring linear tetramethyleneoxy units in the copolymeric chain thereof, i.e., —CH$_2$CH$_2$CH$_2$CH$_2$O—. Such linear tetramethyleneoxy units are characterized by an oxy group (—O—) at one end and a methylene group (—CH$_2$) at the other end, and these linear tetramethyleneoxy units will interconnect with another linear unit such as linear unit I supra in the manner described previously. That is to say, the oxy group of one linear unit will interconnect with the carbonyl group of a second unit.

Particularly preferred polymers of cyclic esters are those which are characterized by the oxypentamethylenecarbonyl chain as seen in recurring structural unit III.

III  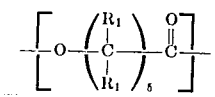

wherein each R$_1$ is hydrogen or lower alkyl, preferably hydrogen or methyl, with the proviso that no more than three R$_1$ variables are substituents other than hydrogen.

The preparation of the cyclic ester polymers is well documented in the patent literature as exemplified by U.S. Pat. Nos. 3,021,309 through 3,021,317; 3,169,945; and 2,962,524. Briefly, the process involves the polymerization of an admixture containing at least one cyclic ester monomer with or without a functional initiator therefor, and a suitable catalyst, the choice of which will depend on the presence or absence of added initiator.

Suitable monomeric cyclic esters which can be employed in the manufacture of the cyclic ester polymers are best illustrated by the following formula:

IV  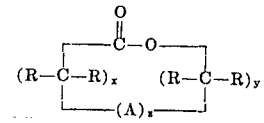

wherein the R, A, x, y, and z variables have the significance noted in unit I supra.

Representative monomeric cyclic esters which are contemplated include, for example, propiolactone; delta-valerolactone; epsilon-caprolactone; zeta-enantholactone; eta-caprylolactone; α,α-dimethyl-β-propiolactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy-delta-valerolactones and epsilon-caprolactones, and the like; 1,4-dioxane-2-one; and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,021,309 to 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-groups. Carboxyl substituents on the initiator will result in polymeric products having carboxyl end-groups. The initiator with the active hydrogen atom will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula

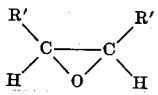

wherein each R′, individually, has the meaning noted in unit II supra, can be reacted with a polyfunctional initiator possessing amino, hydroxyl, and/or carboxyl groups, preferably in the presence of a Lewis acid catalyst such as boron trifluoride. The resulting polymeric products have hydroxyl termination which can be converted to acyloxy or hydrocarbyloxy moieties by conventional techniques. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

In one aspect of the present invention, the cyclic ester polymer is employed in compositions containing any form of commercially available nitrocellulose. The nitrogen content of such nitrocellulose ranges from about 10.9 percent to about 12.2 percent. However, nitrocellulose having a nitrogen content outside this range might also be employed, as for special applications.

The nitrocellulose employed according to the present invention may have any viscosity suitable for the application to which the final composition is to be put. Thus, generally nitrocellulose is suitable which has a standard viscosity, as determined by the procedure described in A.S.T.M. D3.1–56 and D1343–56, of from about 0.05 to about 200,000 seconds. Usually the nitrocellulose will have a standard viscosity of from about 0.05 to 1,000 seconds, and the general range of viscosity for nitrocellulose used in lacquers is from about 0.1 to 5 seconds. However, nitrocellulose having a viscosity outside the foregoing ranges may be employed according to this invention for special applications, such as for dilute wash primer solutions.

Depending upon the properties desired in the final product, the compositions according to the present invention may contain widely varying amounts of cyclic ester polymer with respect to the amount of nitrocellulose.

We have found that usable films are obtained according to the present invention from lacquers having a cyclic ester polymer content between about 10 and about 50 weight percent of the combined weight of cyclic ester polymer and nitrocellulose. For a lacquer, compositions comprising cyclic ester polymer and nitrocellulose generally have maximum hardness when the cyclic ester polymer content is from about 25 to 40 weight percent of the combined weight of cyclic ester polymer and nitrocellulose. Compositions containing about 60 weight percent of cyclic ester polymer and about 40 weight percent nitrocellulose generally have a minimum hardness.

The novel compositions may be employed as wood lacquers, overprint varnishes, printing inks, metal coatings and for other such uses. The cyclic ester polymer is a permanent plasticizer for the nitrocellulose and increases impact resistance without reducing film strength or toughness. Such compositions provide clear, glossy films which have improved resistance to water and organic solvents, yet which maintain grease and oil resistance. Such compositions are further improved, in that the tendency to yellow upon exposure to sunlight is decreased. In wood lacquer or overprint varnish compositions, a range of properties may be obtained by varying either the amount or the molecular weight of the cyclic ester polymer used. For example, using a low molecular weight cyclic ester polymer with a high viscosity nitrocellulose, one may obtain a solution to produce a film of a given strength, which solution has a workable viscosity and yet has a high nonvolatile content. Thus less solvent is employed and a smaller volume of solution is used, as compared to previous lacquers.

Various solvents may be employed in formulating the lacquer compositions of the present invention. The polymers of cyclic esters are soluble in 2-nitropropane, a solvent suitable for flexographic printing inks. Toluene is also an excellent solvent for cyclic ester polymers. Depending on the application, other solvents may be employed to attain the desired degree of volatility and solvency. Many other solvents dissolve polylactones slowly, and it is desirable to warm the composition to speed dissolution.

Suitable ink compositions may contain cyclic ester polymers and nitrocellulose along with dyes or pigments and, optionally, a modifying resin. The inks containing cyclic ester polymers and nitrocellulose are stable and have good flow properties. Adhesion and gloss of these inks are often improved by the addition of a modifying resin, for instance, a polyketone or acrylate resin. Suitable modifying resins include formaldehyde-ketone condensation polymers such as "-Polyketone-0251" (Union Carbide Corporation), acrylates such as copolymers of methyl methacrylate and butyl methacrylate, copolymers of methyl methacrylate, butyl methacrylate and methacrylic acid, e.g., "Acryloid B-66" (Rohm and Haas Company), and the like. Such resins are advantageously used at levels ranging up to about 1 part by weight of modifying resin for about 2 parts by weight of the combination of cyclic ester polymer and nitrocellulose. Of course, many other types of resins may also be used as modifying resins for inks containing cyclic ester polymer and nitrocellulose, such as shellac and rosin ester derivatives, e.g., "Lewisol 28" (Hercules Powder Co.). Resins suitable for use as modifiers must be soluble in solvents for flexographic or gravure inks, such solvents including 2-nitropropane, volatile alcohols, esters, ketones, aromatics, and the like.

In accordance with a further aspect of this invention, inks containing cyclic ester polymers but no nitrocellulose may desirably be formulated for special applications, such as printing on paper or aluminum foil used in packaging frozen foods. Such inks advantageously contain dyes as the coloring materials. These inks exhibit outstanding gloss and brilliancy along with excellent flexibility and adhesion to a wide variety of substrates. These inks contain an appropriate dye, a cyclic ester polymer, and a suitable solvent such as those described previously, e.g., 2-nitropropane, toluene, or the like. The relative proportions are advantageously from about 1 to about 15 weight percent of dye, from about 5 to about 30 weight percent of the cyclic ester polymer, and from about 55 to about 94 weight percent of solvent, each weight percent being based upon the total weight of dye plus cyclic ester polymer plus solvent. Preferred proportions are from about 5 to about 10 weight percent of dye, from about 10 to about 20 weight percent of cyclic ester polymer, and from about 70 to about 85 weight percent of solvent.

As already mentioned, the cyclic ester polymers are outstanding plasticizers in inks containing nitrocellulose, providing flexibility without significantly lowering the film strength or hardness. The cyclic ester polymers generally are odorless and colorless and usually improve film clarity. The cyclic ester polymers do not tend to migrate or bleed and, unlike plasticizers such as dibutyl phthalate, they harden the film instead of increasing its tack. The cyclic ester polymers are resistant to water, exhibit excellent resistance to various common solvents, and improve the light stability of the nitrocellulose ink films.

When pigmented inks are formulated, highly suitable results are obtained by dispersing the pigment into the cyclic ester polymer, as by using a two-roll mill and then formulating the resulting pigment chips into inks. Inks may also be prepared by charging pigment and solvent solutions of cyclic ester polymer and nitrocellulose to a ball mill and grinding, e.g., for 16 to 24 hours. Various dispersing or wetting aids may be employed to facilitate dispersion, such as sucrose acetate isobutyrate, polymeric carboxylic acid salts such as "Tamol 850" (Rohm and Haas Company), a sodium higher alkyl sulfate, e.g., "Tergitol NP-27" (Union Carbide Corp. soybean lecithin such as "Lecithin WD" (Naftone Powder Co.), etc.

The novel compositions of the present invention are further illustrated by the following examples. All parts are by weight unless otherwise indicated. The term "solids" refers to all materials in a formulation other than the solvents.

EXAMPLES 1-10

Various cyclic ester polymers were tested and found compatible with nitrocellulose containing about 11 percent nitrogen (ss one-half second type, Hercules Powder Co., Inc.). Compatibility of the cyclic ester polymers with nitrocellulose was determined by mixing solutions of each cyclic ester polymer with a nitrocellulose solution at various weight ratios of cyclic ester polymer to nitrocellulose. The base nitrocellulose solution was 20 weight percent nitrocellulose, 40 weight percent ethyl acetate, 31.5 weight percent 2-nitropropane, and 8.5 weight percent isopropanol. The cyclic ester polymers were dissolved in a variety of solvents. Films of the mixed solutions were cast on glass plates and air dried. The films were removed from the glass plates and their tensile properties were determined on an Instron Tensile Tester according to A.S.T.M. procedure 683-67T. The details and results are reported in Table 1.

The cyclic ester polymers tested were as follows:
1. Poly-epsilon-caprolactone initiated with diethylene glycol monobutyl ether prepared by bulk polymerization and having a reduced viscosity of 0.06 in benzene.
2. Poly-epsilon-isopropyl-epsilon-caprolactone with a reduced viscosity of about 0.34 in benzene, prepared by bulk polymerization at a temperature of about 60° C. employing dibutyl zinc as catalyst.
3. Poly-delta-valerolactone with a reduced viscosity of about 0.75 in benzene, prepared by bulk polymerization at a temperature of about 60° C. employing dibutyl zinc as catalyst.
4. Poly-eta-caprylolactone with a reduced viscosity of about 0.83 in benzene, prepared by solution polymerization in toluene at a temperature of 60° C. employing dibutylzinc catalyst.
5. Poly-beta-butyrolactone with a reduced viscosity of about 0.21 in benzene, prepared by solution polymerization in toluene at a temperature of 60° C. employing dibutylzinc catalyst.
6. Poly-beta-propiolactone prepared by solution polymerization in toluene at temperatures up to 60° C. employing boron trifluoride etherate as catalyst. This material had a reduced viscosity of 0.10 in dimethylformamide.
7. Poly-epsilon-caprolactone initiated with ethylene glycol and bulk polymerized to a number average molecular weight of 2,000, was acetylated by adding 1.5 equivalents of acetic anhydride and heating. The acetylated poly-epsilon-caprolactone was a solid at room temperature.
8. Epsilon-caprolactone/methyl-epsilon-caprolactone copolymer prepared at a temperature of about 90° C. employing dibutylzinc as catalyst. The product was dissolved in benzene and precipitated with hexane to give a white powder having a reduced viscosity ($I_r$) of 0.4 in benzene.
9. A copolymer was prepared by reacting about 90 parts by weight epsilon-caprolactone and about 10 parts by weight ethylene oxide in benzene at a temperature of 50° C. using phosphorus pentafluoride ($PF_5$) catalyst. The product had an $I_r$ of 0.34 in benzene. 10. Epsilon-caprolactone/tetrahydrofuran copolymer, solution polymerized in heptane at a temperature of about 50°-60° C. employing $PF_5$ catalyst. The copolymer product was obtained as an amorphous monolithic gum which was insoluble in heptane and had an $I_r$ of 0.68 in benzene.

TABLE 1

Compatibility of cyclic ester polymers with nitrocellulose

| | | | Nitrocellulose compatibility | | | Tensile properties | |
|---|---|---|---|---|---|---|---|
| Polymer | Physical form | Solvent | Cyclic ester polymer/nitrocellulose, weight ratio | Solution appearance | Film appearance | Percent elongation | Ultimate stress, p.s.i. |
| Example No.: | | | | | | | |
| (1) Poly-epsilon caprolactone | Waxy solid. | 2-nitro-propane | 1:9 | Clear | Clear | 16 | 6,300 |
| | | | 2:8 | do | do | 12 | 6,450 |

TABLE 1—Continued

Compatibility of cyclic ester polymers with nitrocellulose

| Polymer | Physical form | Solvent | Nitrocellulose compatibility | | | Tensile properties | |
|---------|--------------|---------|------------------------------|--|--|--------------------|--|
| | | | Cyclic ester polymer/nitrocellulose, weight ratio | Solution appearance | Film appearance | Percent elongation | Ultimate stress, p.s.i. |
| (2) Poly-epsilon-isopropyl-epsilon-caprolactone. | Solid | Benzene | 3:7 ...do...<br>4:6 ...do...<br>5:5 ...do... | ...do...<br>...do...<br>...do... | ...do...<br>...do...<br>...do... | 32<br>49<br>65 | 4,400<br>2,400<br>3,400 |
| (3) Poly-delta-valerolactone | Solid | 2-nitro-propane | 1:9<br>1:3<br>1:1 | Clear<br>...do...<br>...do... | Clear<br>...do...<br>...do... | 26<br>17<br>78 | 5,730<br>1,125<br>1,540 |
| (4) Poly-eta-caprylolactone | Solid | 2-nitro-propane | 1:9<br>1:3<br>1:1 | Clear<br>...do...<br>...do... | Clear<br>...do...<br>...do... | 11<br>315 | 5,480<br>5,125 |
| (5) Poly-beta-butyrolactone | Solid | Benzene | 1:9<br>1:3<br>1:1 | Clear<br>...do...<br>...do... | Clear<br>...do...<br>...do... | 16<br>8<br>66 | 7,610<br>4,760<br>1,025 |
| (6) Poly-beta-propiolactone | Solid | Dimethyl-formamide. | 1:9<br>1:3 | Clear<br>...do... | Clear<br>...do... | 9<br>8 | 6,270<br>6,500 |
| (7) Acetylated poly-epsilon-caprolactone | Solid | 2-nitro-propane | 1:9<br>1:3 | Clear<br>...do... | Clear<br>Hazy | 11<br>5 | 7,430<br>5,650 |
| (8) Epsilon-caprolactone/methyl epsilon-caprolactone. | Solid | 2-nitro-propane | 1:9<br>1:3<br>1:2 | Clear<br>...do...<br>...do... | Clear<br>...do...<br>...do... | 13<br>27<br>66 | 5,800<br>3,270<br>350 |
| (9) Epsilon-caprolactone/ethylene oxide | Solid | 2-nitro-propane | 1:9<br>1:3<br>1:1 | Clear<br>...do...<br>...do... | Clear<br>...do...<br>...do... | 24<br>14<br>64 | 5,700<br>1,450<br>1,125 |
| (10) Epsilon-caprolactone/tetrahydrofuran | Solid | 2-nitro-propane | 3:7 | Clear | Clear | 28 | 4,200 |
| Control Nitrocellulose | Solid | | 3:7<br>0:1 | Clear<br>Clear | Clear<br>Clear | 5.5<br>9 | 4,303<br>4,980 |

From Table 1 above, the general compatibility of cyclic ester polymers, whether homopolymers or copolymers, with nitrocellulose is apparent. In general, it is also evident that such compositions give increased extensibility when using minor amounts by weight of cyclic ester polymers without a marked reduction in tensile strength as is typical of solvent type plasticizers. In all of the above examples, cyclic ester polymer/nitrocellulose mixtures containing 10 percent cyclic ester polymer had greater tensile strength than the unmodified nitrocellulose films. The ability of cyclic ester polymers to increase the flexibility and extensibility of nitrocellulose films without substantially decreasing tensile strength permits the manufacture of nitrocellulose articles and coatings with greater strength and durability than compositions currently available.

EXAMPLES 11 and 12

Two particulate poly-epsilon-caprolactone homopolymers were prepared by the dispersion technique, using about 3 percent vinyl chloride-lauryl methacrylate copolymer as an interfacial agent and employing triisobutyl aluminum as catalyst. The polymers had, respectively, reduced viscosities of about 0.6 (polymer I) and about 1.34 (polymer II) in benzene. The compatibility of these two polymers with nitrocellulose containing about 11 percent nitrogen (SS one-half second nitrocellulose, Hercules Powder Co.) was tested according to the procedure described in Examples 1–10. Films were prepared from the mixed solutions and their tensile properties were determined as in Examples 1–10. Table 2 gives the tensile test data.

Films of the mixed solutions were cast onto cold-rolled steel panels at a wet thickness of 3 mils. After air drying overnight the films were heated 1 minute at 100° C. The gloss of the films was determined according to A.S.T.M. procedure D523–62T at an incidence angle of 60°. The hardness of the films was determined using the Sward Hardness test, wherein a balanced rocker is placed on the coating and is started rocking at a predetermined amplitude. The number of rocking cycles is then recorded until the rocking amplitude decreases to a specified value. Impact resistance of the films was determined both on the coated (or direct impact) side of the panel and on the uncoated (or reverse impact) side of the panel using the Gardner Impact Tester which consists of a round-nose steel impact rod in a vertical guide tube and a base plate. The values given in Table 3 are in inch-pounds. A number followed by plus sign indicates no failure in this test. Two numbers indicate the range in coating failure occurred. Samples of the coated panels were exposed 1 sun lamps in an accelerated sunlight exposure test for one week. After 1 week the amount of yellowing in the coating was rated. The results of the foregoing tests are given in Table 3.

TABLE 2

[Tensile properties of cyclic ester polymer nitrocellulose films]

| | Ultimate tensile, p.s.i. | | Elongation, percent | |
|---|---|---|---|---|
| | Polymer I, $I_r=0.6$ | Polymer II, $I_r=1.34$ | Polymer I, $I_r=0.6$ | Polymer II, $I_r=1.34$ |
| Percent nitrocellulose in film, by weight: | | | | |
| 0 | 2,380 | 3,900 | 1,310 | 1,460 |
| 10 | 2,360 | 3,550 | 1,240 | 1,440 |
| 20 | 1,730 | | 970 | |
| 25 | | 4,640 | | 1,490 |
| 30 | 1,410 | | 76 | |
| 40 | 160 | 375 | 115 | 1,670 |
| 50 | 1,270 | 1,440 | 83 | 130 |
| 60 | 2,530 | 4,500 | 43 | 12 |
| 70 | 3,920 | | 16 | |
| 75 | | 5,240 | | 13 |
| 80 | 5,970 | | 16 | |
| 90 | 6,290 | 6,480 | 17 | 29 |
| 100 | 4,980 | 4,980 | 9 | 9 |

NOTE.—All values are averages of two or more test values.

TABLE 3

[Performance of cyclic ester polymer/nitrocellulose coatings on steel panels]

| | Appearance | 60 degree Gardner gloss | Sward hardness | Impact resistance | | Sunlight resistance |
|---|---|---|---|---|---|---|
| | | | | Direct | Reverse | |
| Poly-epsilon-caprolactone ($I_r=0.6$)/nitrocellulose, weight ratio: | | | | | | |
| 1/0 | Hazy | 38 | 27 | 88/120 | 160+ | No yellowing. |

TABLE 3 – Continued

[Performance of cyclic ester polymer/nitrocellulose coatings on steel panels]

| | Appearance | 60 degree Gardner gloss | Sward hardness | Impact resistance | | Sunlight resistance |
|---|---|---|---|---|---|---|
| | | | | Direct | Reverse | |
| 9/1 | do | 46 | 24 | 88/120 | 160+ | Do. |
| 8/2 | do | 66 | 19 | 160+ | 160+ | Do. |
| 7/3 | do | 08 | 10 | 160+ | 160+ | Do. |
| 6/4 | do | 91 | 4 | 160+ | 160+ | Do. |
| 5/5 | Clear | 90 | 15 | 160+ | 160+ | Do. |
| 4/6 | do | 97 | 34 | 160+ | 160+ | Do. |
| 3/7 | do | 91 | 28 | 160+ | 160+ | Do. |
| 2/8 | do | 83 | 32 | 120/160 | 88/100 | Slight yellowing. |
| 1/9 | Blushed | 77 | 30 | 120/160 | 88/120 | Moderate yellowing. |
| 0/1 | do | 68 | 26 | 120/160 | 88/120 | Severe yellowing. |
| Poly-epsilon-caprolactone ($I_r=1.34$)/nitrocellulose, weight ratio: | | | | | | |
| 1/0 | Hazy | 40 | 24 | 120/160 | 160+ | No yellowing. |
| 9/1 | do | 57 | 16 | 160+ | 160+ | Do. |
| 3/1 | do | 43 | 12 | 160+ | 160+ | Do. |
| 6/4 | do | 95 | 4 | 160+ | 160+ | Do. |
| 5/5 | Clear | 70 | 8 | 160+ | 160+ | Do. |
| 4/6 | do | 72 | 26 | 160+ | 160+ | Do. |
| 1/3 | Clear | 72 | 30 | 160+ | 160+ | Slight yellowing. |
| 1/9 | do | 63 | 28 | 160+ | 120/160 | Moderate yellowing. |
| 0/1 | Blushed | 54 | 24 | 120/160 | 120/160 | Severe yellowing. |

Tables 2 and 3 clearly illustrate the improved properties of nitrocellulose films containing from about 10 to about 50 percent of cyclic ester polymer. Films in this composition range have improved elongation and impact resistance without a significant loss in tensile strength or hardness. In addition, the tendency of nitrocellulose to yellow under sunlight is markedly reduced. These properties of cyclic ester polymers render them highly suitable for use with nitrocellulose, as in nitrocellulose wood lacquers, metal coatings, and printing inks.

EXAMPLE 13

Poly-epsilon-caprolactone/nitrocellulose films were prepared using nitrocellulose containing about 12 percent by weight nitrogen, and having a viscosity of one-half second (Hercules Powder Co.). Solutions were prepared of each component and mixtures of the solutions were made at various weight ratios. Films were then cast from these mixtures onto glass plates. When dry, film thicknesses range from 4 to 9 mils. These films were removed from the glass plates by loosening one edge, running water under the edge, and pulling free. The elongation and ultimate stress of the films were measured on an Instron tester according to A.S.T.M. procedure 638-67T.

The base solutions used in this experiment were:

| | |
|---|---|
| 1. Nitrocellulose, ½ second, about 12% nitrogen (30% isopropanol) | 28.6% |
| Ethyl acetate | 40.0% |
| 2-nitropropane | 31.4% |
| 2. Polyepsilon-caprolactone, as in Example 11 ($I_r=0.6$) | 20% |
| 2-nitropropane | 80% |

Mixtures of these solutions were made to give mixed solutions varying in compositions from 0 to 100 percent nitrocellulose solution in increments of 10 percent. The results of tensile tests made on films prepared from these mixed solutions are reported in Table 4.

TABLE 4

Film Properties

| Percent nitrocellulose in film | Ultimate Tensile strength, pounds/inch² | Percentage Elongation |
|---|---|---|
| 100 | 7800 | 18 |
| 90 | 5490 | 5 |
| 80 | 9520 | 22 |
| 70 | 5800 | 30 |
| 60 | 4840 | 57 |
| 50 | 1260 | 130 |
| 40 | 90 | 220 |
| 30 | 1370 | 750 |
| 20 | 2230 | 1240 |
| 10 | 2640 | 1240 |
| 0 | 2390 | 1310 |

Table 4 shows that nitrocellulose with a high nitrogen content can be modified with 10 to 40 percent of cyclic ester polymer to produce films which have increased extensibility will little or no decrease in tensile strength.

EXAMPLE 14

Two overprint lacquers were prepared having the following compositions:

| | Control A | Example 14 |
|---|---|---|
| Nitrocellulose[1], 11% nitrogen, (30% isopropanol) Ethanol/ethyl acetate 1.85:1 weight ratio | 8.6 g. | 12.9 g. |
| Maleic modified rosin ester[2] (50% ethanol) | 11.4 g. | 17.1 g. |
| Dibutyl phthalate | 20.0 g. | — |
| Polyepsilon-caprolactone homopolymer (70 wt. % 2-nitropropane) | 5.0 g. | — |
| Thinner: 2-nitropropane | — | 30.0 g. |
| | 10.0 g. | 20.0 g. |

[1]ss one-half second nitrocellulose (Hercules Powder Co.)

[2]"Pentalyn 830" (Hercules Powder Co.)

The poly-epsilon-caprolactone used above had been bulk polymerized using diethylene glycol monobutly-ether as initiator, and had a reduced viscosity of 0.31 in benzene. Both of the above lacquers were at a viscosity generally suitable for use on both flexographic and gravure printing presses.

With the use of a wire-wound rod, the lacquers were applied to printed box board of the type used for facial tissue containers at a wet film thickness of about 1 mil. After the films had air dried overnight the gloss of the films was measured using a Gardner Laboratory, Inc., gloss meter with an incidence angle of 75°. The abrasion resistance of the overprinted sample was determined using a Sutherland Rub Tester. (This tester is a motor-driven instrument for moving a weighted, unprinted strip of substrate over a printed test specimen through an arc of 2¼ inches for a predetermined number of strokes. Abrasion resistance of the film is indicated by the amount of color transferred from the printed to the unprinted strip.) In this experiment, samples of the printed substrate without an overprint lacquer and coated with each of the overprint lacquers were given an equal number of rubs and the amount of color transfer rated. The data are given in Table

TABLE 5

|  | Printed Sample with | | |
|---|---|---|---|
|  | No Overprint | Control A Lacquer | Example 14 Lacquer |
| 60° gloss | 52 | 92 | 86 |
| Sutherland Rub Test: Amount of Color Transfer After 30 Cycles | Severe | Moderate | Very little |

The data in Table 5 demonstrate the greatly improved abrasion resistance of substrates overprinted with cyclic ester polymer/nitrocellulose lacquers. Such lacquers also greatly improve gloss and attractiveness of printed articles.

EXAMPLES 15–17

The following wood lacquer was prepared for use as a standard or control by mixing the components in the order set out:

Control B

| | |
|---|---|
| RS ½ second nitrocellulose[1], 12% nitrogen, (30% isopropanol) | 14.3 g. |
| Methyl isobutyl ketone/toluene/ethanol 40/40/20 Ratio by weight | 29.0 g. |
| Nonoxidizing cottonseed alkyd[2] (45% xylene) | 10.9 g. |
| Maleic modified rosin ester[3] (50% methyl isobutyl ketone) | 8.0 g. |
| Dibutyl phthalate | 2.5 g. |
| Raw castor oil | 2.5 g. |
| Methyl isobutyl ketone/butyl acetate/toluene 40/20/40 weight ratio | 80.8 g. |

[1] Hercules Powder Co., Inc.

[2] "Chempol 11–4224" (Freeman Chemical Corp.)

[3] "Amberol 801" (Rohm and Haas Company)

The resulting lacquer had a viscosity of about 22 seconds in a Number 4 Ford Cup.

Three lacquers were prepared having the following compositions:

| Example No. | Parts By Weight | | |
|---|---|---|---|
|  | 15 | 16 | 17 |
| Nitrocellulose, ½ second, 12% nitrogen (30% isopropanol) | 14.3 | 14.3 | 14.3 |
| Methyl isobutyl ketone/toluene/ethanol 40/40/20 by weight | 29.0 | 29.0 | 29.0 |
| Polyepsilon-caprolactone initiated with butyl carbitol, and having a reduced viscosity of 0.6 in benzene (25% by weight in toluene) | 4.0 | 10.0 | 20.0 |
| Methyl isobutyl ketone/butyl acetate/ toluene 40/20/40 weight ratio | 51.7 | 32.9 | 43.7 |

The resulting lacquers were clear, free flowing and had a Number 4 Ford Cup viscosity of about 22 seconds.

Films of the above lacquers were cast on cold-rolled steel panels at a wet thickness of 4 mils and the films air dried. When dry, impact resistance of the films was tested. Impact resistance was determined by the Gardner Impact test. The results (given in Table 6 hereinafter) are values between which the coating failed and are in inch-pounds.

Films of the above lacquers were cast on glass plates at a wet thickness of 4 miles and air dried. When dry, hardness of the films was determined using the Walker-Steele Hardness Tester. The hardness of the glass plates used as substrates were 298 seconds. According to this test, the large the value, the greater the hardness.

The above lacquers were applied to walnut veneer panels. Each panel was prepared by first sanding with No. 220 grit paper, wiping with tack rag to remove all dust, spraying with a light coat of nongrain raising stain and allowing to dry, spraying with a wash coat of the lacquers made by thinning the lacquers to about 3 percent nonvolatile content, and after about 5 minutes drying in air, applying sealer coat of the above formulations. After air drying 4 hours the panels were hand sanded using No. 220 grit stearated sandpaper. A topcoat of lacquer was then applied to the sanded panels and after about 4 hours air drying, print resistance of the films was checked. For the print test, strips of cheesecloth were placed on the panel and steel weights were placed on cheesecloth to a loading of one-half pound per square inch. The panel was then placed in an oven at 120° F. The panel was removed at one-half hour intervals and examined for print, which is the transfer of the pattern of the cheesecloth to the coating. If print was observed, the cheesecloth was moved to another area, and the test repeated at half hour intervals until no print was observed.

The data are given in Table 6.

TABLE 6

Performance of Polyepsilon-caprolactone/Nitrocellulose Wood Lacquers

|  | Control B | Example 15 | Example 16 | Example 17 |
|---|---|---|---|---|
| Film Appearance | Clear | Clear | Clear | Clear |
| Hardness, Walker-Steele, seconds | 152 | 214 | 214 | 182 |
| Impact Resistance inch-pounds, pass/fail | 30/40 | 30/40 | 50/60 | 40/50 |
| Print Resistance: | | | | |
| After ½ hour | Print | none | none | none |
| After 3 hours | Print | — | — | — |

The data in Table 6 show the unique plasticizing effect of cyclic ester polymer on nitrocellulose. The poly-epsilon-caprolactone/nitrocellulose lacquers gave films which were harder but yet more resistant to impact than those of the control. The poly-epsilon-caprolactone/nitrocellulose films also dried much more rapidly, as indicated by their greater print resistance. This property enables one to reduce the time required for drying between lacquer coats and before further processing of coated articles.

EXAMPLES 18–21

The two poly-epsilon-caprolactone homopolymers described in Examples 11 and 12 were used to formulate a series of inks with nitrocellulose (ss one-half second nitrocellulose, Hercules Powder Co.) containing about 11 percent nitrogen. The weight ratio of poly-epsilon-caprolactone/nitrocellulose was 1:1 for all of the inks. Both a dye and a pigment were used as colorants in the inks. The dye was dispersed by simply dissolving in the solvent solution of the poly-epsilon-caprolactone/nitrocellulose. The pigments were dispersed into the poly-epsilon-caprolactone polymer by milling on a heated two-roll mill to obtain a product mixture of poly-epsilon-caprolactone and pigment, which product was then dissolved into the remaining ingredients using a high shear mixer to form the inks. The base nitrocellulose solution used in these inks contained 20 percent nitrocellulose, 8.6 percent isopropanol, 35.7 percent isopropyl acetate, and 35.7 percent 2-nitropropane. The remaining solvent in each ink was 2-nitropropane. (See Table 7 hereinafter for the ink compositions.)

The above inks were applied to several substrates with an

Anilox Handproofer which closely duplicates the action of a flexographic press. This instrument is made up of a rubber roll and an engraved metal roll which are fitted into a frame so that they turn against each other. Ink is placed in the nip between the two rolls. The ink is metered on to the rubber roll by the engraved metal roll and transferred from the rubber roll to the substrate as the handproofer is rolled on the substrate. After application of the ink, each printed sample was dried for about 10 seconds at about 110° C.

Mar resistance of the printed substrates was evaluated by the fingernail scratch test. In this test the fingernail is drawn across the printed substrate using moderate pressure and the amount of ink film polishing, scratching, or ink removal is rated.

Flexibility of the ink film is determined by grasping the printed substrate with both hands with the thumbs about 1 inch apart. The hands are then moved in a motion similar to pedaling a bicycle for 10 cycles and the amount of pinholeing, cracking, or flaking of the ink film is rated.

Adhesion is tested by applying cellophane tape to the printed substrate and pressing down firmly. The tape is then removed by pulling off at about 180° angle, first slowly, then rapidly. The adhesion of the ink film is rated by the amount of ink removed by the tape.

Gloss of the ink film was rated by visual inspection.

Ice water resistance of the ink films was judged by immersing the printed substrate in ice water for 5 minutes and then performing the flexibility test described above with the film still immersed.

The above test are commonly used to judge ink film properties by persons skilled in the art. The data are given in Table 7.

The data in Table 7 clearly demonstrate the suitability of inks having poly-epsilon-caprolactone/nitrocellulose binders with either dye or pigment-type colorants. The inks have good to excellent mar resistance, gloss, and adhesion along with good to excellent flexibility both at room temperature and in ice water. These properties render such inks of great value in a wide variety of packaging applications.

EXAMPLES 22-26

A series of inks was prepared, each of which contained mixtures of nitrocellulose, poly-epsilon-caprolactone, and a modifying resin as the binder. The nitrocellulose (ss one-half second, Hercules Powder Co.) contained about 11 percent nitrogen. The poly-epsilon-caprolactone had a reduced viscosity of 0.6 and was the same as that described in Examples 11 and 12. The modifying resins used were materials commonly employed in the manufacture of flexographic inks; an acrylate copolymer, a cyclic keltone condensation polymer, a maleic modified rosin ester, and shellac. Each ink was prepared with a weight ratio of 7:5:3 of nitrocellulose/poly-epsilon-caprolactone/modifying resin.

The inks were prepared by adding 15.0 parts of titanium dioxide to 25.0 parts of a 2-nitropropane solution containing about 20 weight percent poly-epsilon-caprolactone. Various pigment dispersion aids were also added to aid pigment dispersion. Glass beads were added to each ink and the inks were placed on motor driven rolls whereby the glass beads provided ball-mill-type grinding action. The inks were rolled overnight, 16–24 hours, and the remaining components of each ink were added. The inks were then replaced on the motor driven rolls to ensure that homogeneous mixtures were obtained. (Table 8 hereinafter gives the details as regards each formulation.)

The inks were then applied to several substrates and the properties of the ink films were tested as described in Examples 18 to 21. The data are given in Table 8.

TABLE 7

[1:1 Poly-epsilon-caprolactone/nitrocellulose inks]

|  | Dye inks | | Pigmented inks | |
|---|---|---|---|---|
| Ink properties: | | | | |
| Poly-epsilon-caprolactone used | $I_r=0.6$ | $I_r=1.34$ | $I_r=0.6$ | $I_r=1.34$ |
| Total solids | 20% | 13% | 26.7% | 22.8% |
| Dye or pigment (percent of total solids) | 10% [1] | 10% [1] | 50% [2] | 50% [2] |
| Ink film properties: | | | | |
| Mar resistance | Excellent | Good plus | Good | Good |
| Flexibility | do | Excellent | do | Excellent |
| Adhesion to: | | | | |
| Nitrocellulose coated cellophane | do | do | Excellent | Do |
| Polyvinylidene chloride coated cellophane | do | do | Good | Do |
| Cast coated paper | do | do | Excellent | Do |
| Visual gloss | do | do | Good | Good |
| Ice water resistance | do | do | Excellent | Excellent |

[1] Dye was DuPont Victoria Pure Glue BO.
[2] Pigment was DuPont Ti-Pure R-900, $TiO_2$.

TABLE 8

[Inks containing poly-epsilon-caprolactone, nitrocellulose, and modifying resin]

| | Example number | | | | |
|---|---|---|---|---|---|
| | 22 | 23 | 24 | 25 | 26 |
| Ink composition by weight: | | | | | |
| Titanium dioxide | 15.0 grams | 15.0 grams | 15.0 grams | 15.0 grams | 15.0 grams |
| Poly-epsilon-caprolactone | 5.0 grams | 5.0 grams | 5.0 grams | 5.0 grams | 5.0 grams |
| Nitrocellulose | 7.0 grams | 7.0 grams | 7.0 grams | 7.0 grams | 10.0 grams |
| Modifying resin: | | | | | |
| Type | Polyketone.[1] | Acrylic [2] | Shellac.[3] | Rosin derivative.[4] | None. |
| Weight | 3.0 grams | 3.0 grams | 3.0 grams | 3.0 grams | 0 gram |
| Solvents: | | | | | |
| 2-nitropropane | 35.0 grams | 30.5 grams | 30.5 grams | 35.0 grams | 35.0 grams |
| Isopropanol | 3.0 grams | 3.0 grams | 3.0 grams | 3.0 grams | 4.3 grams |
| Ethyl acetate | 14.0 grams | 14.0 grams | 14.0 grams | 14.0 grams | 14.0 grams |
| Toluene | | 3.67 grams | | | |
| Ethanol | | | 5.6 grams | | |
| Wetting aids: | | | | | |
| Type | Soybean lecithin [5] | Sucrose acetate isobutyrate [6] | Polymeric carboxylic acid salt [7] | Ethylene oxide adduct of nonylphenol [8] | None. |
| Weight | 0.4 gram | 0.4 gram | 0.1 gram | 0.1 gram | 0 gram. |

TABLE 8—Continued
[Inks containing poly-epsilon-caprolactone, nitrocellulose, and modifying resin]

| | Example number | | | | |
|---|---|---|---|---|---|
| | 22 | 23 | 24 | 25 | 26 |
| Ink film properties: | | | | | |
| Mar resistance | Excellent | Excellent | Excellent | Good | Excellent. |
| Flexibility | do | do | do | Excellent | Do. |
| Adhesion to: | | | | | |
| Uncoated cellophane | Good plus | do | do | Good | Poor. |
| Poly(vinylidene chloride) coated cellophane. | do | do | do | Excellent | Good. |
| Shellac washed aluminum foil | do | do | do | do | Do. |
| Visual gloss | Good | Good | Fair | Good plus | Fair plus. |

[1] "Polyketone K-1717" (Lawter Chemical Company).
[2] "Acryloid B-66-40" (Rohm and Haas Co.).
[3] "Pure White Shellac Lacquer" (The Sherwin-Williams Co.).
[4] "Lewisol 28" (Hercules Powder Co.).
[5] "Lecithin WD" (Naftone Powder Co.).
[6] "SAIB" (Eastman Chemical Products Inc.).
[7] "Tamol 850" (Rohm and Haas Co.).
[8] "TERGITOL NP-27" (Union Carbide Corporation).

The data presented in Table 8 demonstrate that cyclic ester polymer/nitrocellulose based inks can be modified to obtain properties desired for specific applications. This latitude in formulation greatly increases the number of potential applications for such inks.

EXAMPLES 27-30

The two poly-epsilon-caprolactone polymers described in Examples 11 and 12 were formulated into inks having both dye and pigment colorants. No other materials were employed as binders.

Where a dye was employed as colorant, the dye was added to a 2-nitropropane solution of poly-epsilon-caprolactone and was dispersed and dissolved by agitation.

Where a pigment was employed, the pigment was first dispersed into the poly-epsilon-caprolactone on a heated two-roll mill and the resulting pigment chips were then dissolved into the remaining ingredients using a high shear mixer.

The inks were applied to and tested on various substrates as described in Examples 18 to 21. The ink compositions and resulting data are given in Table 9.

where the flexibility at low temperatures and the water resistance imparted by the poly-epsilon-caprolactone are essential properties, e.g., as in frozen food packaging.

EXAMPLE 31

Poly-epsilon-caprolactone having a reduced viscosity of 0.6 and described in Examples 11 and 12 was admixed with cellulose acetate butyrate (Tenth Second butyrate, Eastman Chemical Products) containing 13 percent acetal and 37 percent butyral and having a viscosity of about 0.1 seconds as determined by A.S.T.M. method D-1343-54T. These admixtures were prepared by dissolving each of the polymers in 2-nitropropane to give solutions containing about 20 percent polymer. Admixtures of these solutions were then prepared in the proportions shown in Table 10 hereinafter. Films of these mixed solutions were cast on glass plates giving dried films about 5 to 6 mils thick. The tensile properties of the dried films were determined as described in Examples 1-10. The data are given in Table 10.

The films containing less than about 50 percent of poly-epsilon-caprolactone were clear, indicating compatibility of

TABLE 9
[Inks based on poly-epsilon-caprolactone]

| | Example number | | | |
|---|---|---|---|---|
| | 27 | 28 | 29 | 30 |
| | Dye inks | | Pigmented inks | |
| Ink properties: | | | | |
| Poly-epsilon-caprolactone used | $I_r=0.6$ | $I_r=1.34$ | $I_r=0.6$ | $I_r=1.34$. |
| Solvent | 2-NP[1] | 2-NP | 2-NP | 2-NP. |
| Total solids | 20% | 11.0% | 32.2% | 19.8%. |
| Dye or pigment, percent of total solids | 10[2] | 10[2] | 50[3] | 50.[3] |
| Ink film properties: | | | | |
| Mar resistance | Good | Good | Fair | Fair. |
| Flexibility | Excellent | Excellent | Excellent | Excellent. |
| Adhesion to: | | | | |
| Uncoated cellophane | Excellent | Good plus | Poor | Poor. |
| N/C[4] coated cellophane | do | Excellent | Excellent | Excellent. |
| PVDC[5] coated cellophane | do | do | do | Do. |
| Mylar[6] | Good | do | do | Do. |
| Shellac washed aluminum foil | Excellent | do | do | Do. |
| Glassine paper | do | do | do | Do. |
| Visual gloss | do | do | Good | Fair. |
| Ice water resistance | do | do | Good plus | Good. |
| | do | do | Excellent | Excellent. |

[1] 2-nitropropane.
[2] Dye was Victoria Pure Blue BO (E. I. du Pont).
[3] Pigment was Ti-Pure R-990 (E. I. du Pont).
[4] N/C = Nitrocellulose.
[5] PVDC = poly(vinylidene chloride).
[6] Polyethylene terephthalate.

The dye inks gave brilliant, transparent films which adhered well to most substrates. The presence of the dye, Victoria Pure Blue BO, appeared to prevent crystallization of the poly-epsilon-caprolactone and the resulting haziness which sometimes occurs in clear films. The pigmented inks showed satisfactory gloss and adhesion on most substrates. All of the inks had good flow and tack, were easily applied, and wetted the substrates properly. Such inks would find application poly-epsilon-caprolactone and cellulose acetate butyrate in this range of compositions. Films with about 50 percent poly-epsilon-caprolactone or higher were hazy. Films containing less than about 10 percent poly-epsilon-caprolactone were too brittle to be removed intact from the glass plated for testing.

The demonstrated compatibility of poly-epsilon-caprolactone with cellulose acetate butyrate indicates the wide scope of possible application of cyclic ester polymers as modifiers

TABLE 10

Physical properties of poly-epsilon-caprolactone/cellulose acetate butyrate

| Ratio of poly-epsilon-caprolactone/cellulose acetate butyrate, by weight: | Ultimate tensile strength pounds/inch² | Percent elongation |
|---|---|---|
| 1:0 | 2,300 | 1,400 |
| 9:1 | 1,550 | 710 |
| 3:1 | 1,900 | 220 |
| 3:2 | 2,100 | 100 |
| 1:1 | 2,530 | 22 |
| 2:3 | 670 | 45 |
| 1:3 | 3,130 | 23 | for cellulosic polymers. Cellulose based polymers are, of course, used in a wide variety of applications such as molded articles, protective coatings, paints, and inks, to mention only a few.

EXAMPLE 32

A poly-beta-propiolactone homopolymer, prepared by solution polymerization in toluene employing boron trifluoride ethanoate as catalyst, and having a reduced viscosity of 0.09, was formulated into an ink having the following composition:

| | |
|---|---|
| Poly-beta-propiolactone | 5.0 g. |
| Nitrocellulose (ss ¼ second nitrocellulose, Hercules Powder Co.) about 11% nitrogen, (about 30% isopropanol) | 21.5 g. |
| Primrose Chrome yellow pigment | 33.0 g. |
| Ethanol | 18.5 g. |
| Ethyl Acetate | 10.0 g. |
| 2-nitropropane | 12.0 g. |
| Dilution Solvents: | |
| 2-nitropropane | 25.0 g. |
| Acetone | 5.0 g. |

The above ink was prepared in a one-half pint ball mill by (1) dissolving the poly-beta-propiolactone in about 12.0 grams of 2-nitropropane, (2) adding to this solution the nitrocellulose dissolved in the ethanol and ethyl acetate solvents, (3) adding the pigment and mixing until homogeneous, (4) adding 15.0 grams of 2-nitropropane to achieve proper grinding viscosity, (5) rolling the ball mill for about 48 hours on motor driven rolls to disperse the pigment, and (6) adding the remaining thinning solvents to achieve a viscosity suitable for flexographic printing.

The resulting ink was free flowing and the pigment was well dispersed. The ink was applied to two commonly used packaging films and then tested, employing the procedure described in Examples 18 to 21. The data are given in Table 11.

TABLE 11

Properties of an Ink Based On

Poly-beta-Propiolactone/Nitrocellulose

| property | Result |
|---|---|
| Mar resistance | Good |
| Flexibility | Good |
| Adhesion to: | |
| Uncoated cellophane | Excellent |
| Corona discharged treated Polyethylene | Good |
| Visual gloss | Fair |

The data in Table 11 indicate the satisfactory performance of poly-beta-propiolactone/nitrocellulose based inks on the foregoing packaging films.

Variations can of course be made without departing from the spirit of this invention.

What is claimed is:

1. A plasticized composition comprising (1) nitrocellulose; and (2) a linear polymer of a cyclic ester which has a reduced viscosity value of at least about 0.02 as determined at a concentration of 0.2 grams of said polymer in 100 milliliters of benzene at 30° C., said linear polymer being characterized by the recurring structural unit

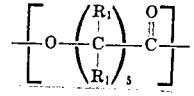

wherein each $R_1$ is of the group consisting of hydrogen and methyl, with the proviso that no more than three $R_1$ substituents are groups other than hydrogen; (3) said linear polymer being present in an amount ranging from about 10 to about 50 weight percent, based on the total weight of said linear polymer and said nitrocellulose.

2. A lacquer comprising (1) nitrocellulose; (2) a linear polymer of a cyclic ester which has a reduced viscosity value of from about 0.1 to about 15 as determined at a concentration of 0.2 grams of said polymer in 100 milliliters of benzene at 30° C., said linear polymer being characterized by the recurring structural unit

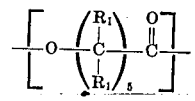

wherein $R_1$ is of the group consisting of hydrogen and methyl, with the proviso that no more than three $R_1$ substituents are groups other than hydrogen; (3) said linear polymer being present in an amount ranging from about 10 to about 50 weight percent, based on the total weight of said linear polymer and said nitrocellulose; and (4) an organic solvent.

3. A printing ink composition comprising (1) a linear polymer of a cyclic ester which has a reduced viscosity value of from about 0.1 to about 15 as determined at a concentration of 0.2 gram of said polymer in 100 milliliters of benzene at 30° C., said linear polymer being characterized by the recurring structural unit

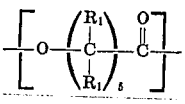

wherein each $R_1$ is of the group consisting of hydrogen and methyl, with the proviso that no more than three $R_1$ substituents are groups other than hydrogen; (2) and organic solvent; (3) a colorant and (4) nitrocellulose.

4. The composition of claim 1 wherein said linear polymer of a cyclic ester is further characterized by the recurring structural unit

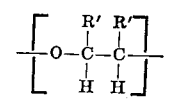

wherein each R', individually, is hydrogen, alkyl, cycloalkyl, aryl, or chloroalkyl, or wherein the two R' variables together with the ethylene moiety of the oxyethylene chain form a saturated cycloaiohatic hydrocarbon ring which has from four to eight carbon atoms.

5. The composition of claim 1 wherein said recurring structural unit of said cyclic ester polymer is oxypentamethylenecarbonyl.

6. The plasticized composition of claim 1 wherein said linear polymer of a cyclic ester has a reduced viscosity value of from about 0.1 to about 15.

7. The composition of claim 2 wherein said recurring structural unit of said cyclic ester polymer is oxpentamethylenecarbonyl.

8. The composition of claim 3 wherein said recurring structural unit of said cyclic ester polymer is oxypentamethylenecarbonyl.

* * * * *